United States Patent [19]

Hashimoto

[11] Patent Number: 4,461,851
[45] Date of Patent: Jul. 24, 1984

[54] FOAM-FORMING ORGANOPOLYSILOXANE COMPOSITION

[75] Inventor: Mitsuyoshi Hashimoto, Horiguchi, Japan

[73] Assignee: General Electric Company, Waterford, N.Y.

[21] Appl. No.: 527,154

[22] Filed: Aug. 26, 1983

[30] Foreign Application Priority Data

Sep. 8, 1982 [JP] Japan ................. 57-156399

[51] Int. Cl.$^3$ .............................................. C08F 4/44
[52] U.S. Cl. ................................. 521/110; 521/119; 521/123; 521/154; 528/15; 528/31
[58] Field of Search ............... 521/110, 119, 123, 154; 528/15, 31

[56] References Cited

U.S. PATENT DOCUMENTS

| | | | |
|---|---|---|---|
| 2,967,170 | 1/1961 | Merker | 528/31 |
| 3,943,091 | 3/1976 | Akiyama | 528/31 |
| 3,960,786 | 6/1976 | Akiyama | 528/31 |

*Primary Examiner*—Melvyn I. Marquis
*Attorney, Agent, or Firm*—Gary L. Loser

[57] ABSTRACT

A foam-forming organopolysiloxane composition comprising:
(A) 100 parts by weight of $\alpha,\omega$dihydroxydiorganopolysiloxane;
(B) 0.05–50 parts by weight of a low molecular weight $\alpha,\omega$dihydroxydiorganopolysiloxane;
(C) 0.5 to 30 moles Si-H per mole SiOH of (A) and (B) as an organohydrogenpolysiloxane having at least two silicon-bonded hydrogen atoms per molecule; and
(D) 0.1 to 200 ppm of a platinum-containing compound.

11 Claims, No Drawings

FOAM-FORMING ORGANOPOLYSILOXANE COMPOSITION

BACKGROUND OF THE INVENTION

The present application claims priority of Japanese patent application Ser. No. 82/156399, filed Sept. 8, 1982.

The present invention relates to novel foam-forming, room temperature vulcanizable (RTV) organopolysiloxane compositions having increased foam-forming ratio and excellent foamability. Some technologies have been known for RTV foam-forming organopolysiloxane compositions, but most of them could not be applied to commercial production.

In U.S. Pat. No. 3,070,555 Bruner invented RTV foam-forming organopolysiloxane compositions utilizing the dehydrogenation reaction of $\alpha,\omega$-diorganopolysiloxane diol and organohydrogenpolysiloxane in the presence of a stannous carboxylate catalyst.

In U.S. Pat. No. 3,338,847 Nitzsche invented similar compositions comprising $\alpha,\omega$-diorganopolysiloxane diol, organohydrogenpolysiloxane, and unsaturated hydrocarbon containing hydroxyorganopolysiloxane in the presence of a metal carboxylate catalyst.

In U.S. Pat. No. 2,956,032 Joyce invented flame retardant RTV foam-forming organopolysiloxane compositions comprising $\alpha,\omega$-diorganopolysiloxane diol, organohydrogenpolysiloxane, stannous carboxylate and $NiBr_2$.

In U.S. Pat. No. 3,428,580 Nitzsche invented flame retardant RTV foam-forming organopolysiloxane compositions comprising $\alpha,\omega$-diorganopolysiloxane diol, organohydrogenpolysiloxane, quaternary ammonium salt catalyst and a heavy metal carboxylate.

In Nippon Tokkyo Koukoku Koho 45-11839 (Japanese Patent Publication) Murphy invented an RTV foam-forming organopolysiloxane composition comprising $\alpha,\omega$-diorganopolysiloxane diol, organohydrogenpolysiloxane and aminohydroxyorganopolysiloxane compounds as the dehydrogenation catalyst.

In Nippon Tokkyo Kokai Koho 51-46352 Endo invented RTV foam-forming organopolysiloxane compositions comprising $\alpha,\omega$-diorganopolysiloxane diol, organohydrogenpolysiloxane and a platinum catalyst.

However, all of these technologies gave RTV foam-forming compositions having low foam-forming capability and inferior foam-formability. Accordingly, the previous compositions could only be applied to limited commercial production. The present invention is based on the discovery of a new class of RTV foam-forming compositions which overcome the defects of previous technologies and provide improved compositions having high foam-forming ratios.

SUMMARY OF THE INVENTION

In accordance with the present invention there is provided a foam-forming organopolysiloxane composition comprising:

(A) 100 parts of $\alpha,\omega$-diorganopolysiloxane diol having the formula

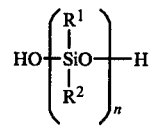

where $R^1$ and $R^2$ are monovalent hydrocarbon radicals or substituted monovalent hydrocarbon radicals and n ranges from 200 to 3000;

(B) 0.05 to 50 parts of low molecular weight $\alpha,\omega$-diorganopolysiloxane diol having the formula

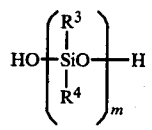

where $R^3$ and $R^4$ are monovalent hydrocarbon radicals or substituted monovalent hydrocarbon radiclas and m ranges from 2 to 46;

(C) 0.5 to 30 moles of Si-H groups per mole of silanol groups in (A) and (B) as an organohydrogenpolysiloxane having at least two Si-H groups per molecule and the formula

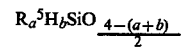

where $R^5$ is a saturated monovalent hydrocarbon radical, a is a number varying from 0 to 2 inclusive, b is a number varying from 1 to 3 inclusive, and a+b varies from 1 to 3 inclusive; and (D) 0.1 to 200 ppm of a platinum-containing compound to catalyze the dehydrogenation reaction of (A), (B) and (C).

DESCRIPTION OF THE INVENTION

The (A) component of the present invention is an $\alpha,\omega$-dihydroxydiorganopolysiloxane, preferably $\alpha,\omega$-dihydroxydimethylpolysiloxane, with the formula

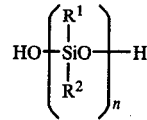

where $R^1$, $R^2$ and n are as previously defined. The polymerization degree, n, must be within the range of 200-3000 so as to provide superior physical strength to the cured foam. If n is less than 200, elongation of the cured foam is inferior and the elasticity is inadequate. If n is more than 3000, formation of a homogenous composition is difficult and the processability is reduced. In a more preferred embodiment, n ranges from 400 to 2000.

$R^1$ and $R^2$ are monovalent hydrocarbon radicals or substituted monovalent hydrocarbon radicals, for example, alkyl radicals such as methyl, ethyl, propyl, butyl, pentyl and hexyl radicals; aryl radicals such as phenyl and naphthyl radicals; and substituted monovalent hydrocarbon radicals such as chloromethyl and 3,3,3-trifluoropropyl radicals. Both $R^1$ and $R^2$ are preferably methyl groups from the standpoint of ease of synthesis and commercial availability.

The (B) component of the present invention is a low molecular weight α,ω-dihydroxydiorganopolysiloxane which functions to provide a high foam-forming ratio and good foamability to the RTV foam-forming organopolysiloxane composition. Ingredient (B) has the general formula

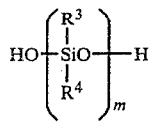

where $R^3$, $R^4$ and m are as previously defined. Each of $R^3$ and $R^4$ is the same as $R^1$ and $R^2$ previously described and both are also preferably methyl groups from the standpoint of ease of synthesis and commercial availability. The polymerization degree, m, must be within the range of 2–46 and preferably is within the range of 2–24. If m is more than 46 and RTV foam-forming organopolysiloxane composition with a high foam-forming ratio and good foamability is not obtained.

The amount of (B) component added to 100 parts of (A) component is within the range of 0.05–50, and preferably ranges from 1–20 parts (B) per 100 parts (A). If the amount of (B) component added is less than 0.05 parts a composition with a high foam-forming ratio and good foamability would not be obtained. If more than 50 parts of component (B) is added, sufficient physical strength of the foam could not be obtained.

Component (C) of the present invention functions to evolve hydrogen gas by reaction with (A) and (B) and to cross-link the foam product. (C) component consists of an organohydrogenpolysiloxane containing two or more Si-H groups and having the formula

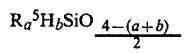

where $R^5$, a and b are as previously defined. $R^5$ is a saturated monovalent hydrocarbon radical, preferably having from 1 to 6 carbon atoms. Examples of $R^5$ include methyl, ethyl, propyl, butyl, pentyl and hexyl groups. Methyl is the most preferred $R^5$ group for ease of commercial availability and low cost.

The hydrogen atoms are attached to the silicon atoms and can be attached to terminal or interior silicon atoms. The organohydrogensiloxane can be linear, ringed or branched. The amount of (C) component added is 0.5 to 30 moles of Si-H groups per mole of Si-OH groups in the (A) and (B) components, and more preferably ranges from 3–20 moles Si-H groups per mole of Si-OH groups. If the amount of component (C) is less than 0.5 moles per mole of silanol, a foam composition with high foam-forming ratio and good foamability could not be obtained. If the amount of (C) is greater than 30 moles of Si-H per mole Si-OH, sufficient physical strength of the foam is not possible.

The (D) component of the present invention functions to catalyze the reaction of (A), (B) and (C) and consists of platinum compounds such as platinum metal, chloroplatinic acid, platinum-olefin complexes, and platinum-vinyl silane or siloxane complexes, platinum-phosphite complexes and platinum-phosphine complexes. Among these, chloroplatinic acid or platinum-vinylsilane or siloxane complexes are most preferred so as to provide good storage stability and an appropriate foam-forming cure speed.

The amount of component (D) required ranges from 0.1–200 ppm of platinum content based on the total of (A), (B) and (C), and preferably ranges from 1–50 ppm platinum. If the amount of platinum utilized is less than 0.1 ppm, the rate of the dehydrogenation reaction is very slow and if more than 200 ppm platinum is used the stability of the cured foam is poor and the production costs excessive.

Besides components (A), (B), (C) and (D), a diluent silicone oil such as triorganosilyl stopped diorganopolysiloxanes or vinylorganopolysiloxanes can be added without departing from the main object of the present invention. Moreover, fillers, pigments, dyes, thermosetting additives, flame retardant additives and the like can be added without departing from the scope and spirit of the present invention.

The following examples further illustrate the claimed invention. Parts are given by weight unless specified otherwise.

EXAMPLES

Example 1

The following compositions, containing α,ω-dihydroxydimethylpolysiloxane (3500 cps at 25° C.) having the average formula

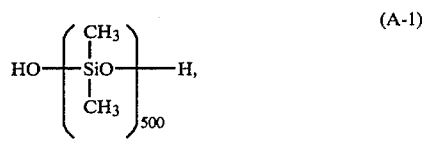

low molecular weight α,ω-dihydroxydimethylpolysiloxane having the average formula

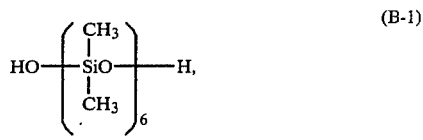

methylhydrogenpolysiloxane (100 cps. at 25 C.) having the average formula

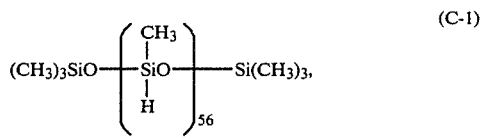

and 5 weight percent chloroplatinic acid containing isopropyl alcohol solution, (D-1) were manufactured as illustrated in Table I. Samples 1 and 6 are reference samples which do not include the low molecular weight α,ω-dihydroxydimethylpolysiloxane.

Each sample was cured at 20° C., 60% relative humidity for one hour. The samples foam-forming ratio and foamability were evaluated, with the results set forth in Table I.

TABLE I

| | Sample | | | | | | | | | |
|---|---|---|---|---|---|---|---|---|---|---|
| | 1 | 2 | 3 | 4 | 5 | 6 | 7 | 8 | 9 | 10 |
| A-1 | 100 | 100 | 100 | 100 | 100 | 100 | 100 | 100 | 100 | 100 |
| B-1 | 0 | 0.5 | 2 | 4 | 6 | 0 | 0.5 | 2 | 4 | 6 |
| C-1 | 2.5 | 2.5 | 2.5 | 2.5 | 2.5 | 5 | 5 | 5 | 5 | 5 |
| D-1 | 0.3 | 0.3 | 0.3 | 0.3 | 0.3 | 0.3 | 0.3 | 0.3 | 0.3 | 0.3 |
| Mole ratio Si—H/SiOH | 7.4 | 5.2 | 2.8 | 1.7 | 1.3 | 14.8 | 10.4 | 5.6 | 3.4 | 2.1 |
| Foam-forming ratio | 3 | 6 | 8 | 14 | 14 | 3.5 | 9 | 13 | 15 | 15 |
| Foam-ability | hetero geneous poor | hetero geneous poor | homo geneous good | homo geneous good | homo geneous good | hetero geneous poor | hetero geneous poor | homo geneous good | homo geneous good | homo geneous good |

Example 2

The following compositions, containing α,ω-dihydroxymethylphenylpolysiloxane (4500 cps. at 25° C.) having the average formula

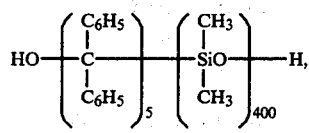
(A-2)

low molecular weight α,ω dihydroxydimethylpolysiloxane having the average formula

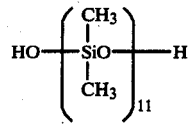

methylhydrogen polysiloxane, cohydrolysis product of H Si Cl$_3$ and (CH$_3$)$_2$ Si HCl with a mole ratio of 1:3; (C-2) and 2% platinum containing platinum-tetramethyl tetravinyl cyclosiloxane complex, (D-2) were manufactured as illustrated in Table II. Sample numbers 11 and 15 are reference samples that do not include any low molecular weight α,ω dihydroxydimethylpolysiloxane.

Each sample was cured under the same conditions as Example 1, and its foam-forming ratio and foamability evaluated. The results are set forth in Table II.

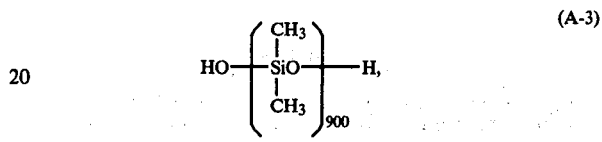
(A-3)

low molecular weight α,ω-dihydroxydimethylpolysiloxane having the average formula

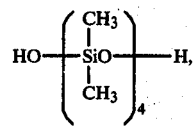
(B-3)

phenyl-containing methylhydrogenpolysiloxane (80 cps. at 25° C.) having the average formula

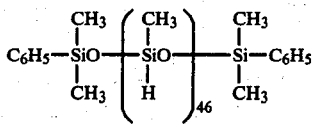
(C-3)

and 5 weight percent chloroplatinic acid solution in octanol, (D-3) and various fillers (shown in Table III), are manufactured as shown in Table III. Sample numbers 19, 22 and 25 are reference samples that do not include the low molecular weight polysiloxane diol.

TABLE II

| | Sample | | | | | | | |
|---|---|---|---|---|---|---|---|---|
| | 11 | 12 | 13 | 14 | 15 | 16 | 17 | 18 |
| A-2 | 100 | 100 | 100 | 100 | 100 | 100 | 100 | 100 |
| B-2 | 0 | 2 | 6 | 12 | 0 | 2 | 6 | 12 |
| C-2 | 7.5 | 7.5 | 7.5 | 7.5 | 10 | 10 | 10 | 10 |
| D-2 | 0.4 | 0.4 | 0.4 | 0.4 | 0.4 | 0.4 | 0.4 | 0.4 |
| Mole Ratio SiH/SiOH | 27.3 | 18.2 | 11.5 | 5.5 | 36.0 | 24.3 | 14.9 | 7.5 |
| Foam-Forming Ratio | 3.5 | 10 | 12 | 14 | 4 | 11 | 14 | 16 |
| Foamability | hetero geneous poor | homo geneous good | homo geneous good | homo geneous good | hetero genous poor | homo geneous good | homo geneous good | homo geneous good |

Example 3

The following compositions, containing α,ω-dihydroxydimethylpolysiloxane (10,000 cps. at 25° C.) having the average formula Each sample was cured the same as in Example 1. The foam-forming ratio and foamability were evaluated, and the results set forth in Table III.

TABLE III

| | Sample | | | | | | | | |
|---|---|---|---|---|---|---|---|---|---|
| | 19 | 20 | 21 | 22 | 23 | 24 | 25 | 26 | 27 |
| A-3 | 100 | 100 | 100 | 100 | 100 | 100 | 100 | 100 | 100 |
| B-3 | 0 | 4 | 6 | 0 | 4 | 6 | 0 | 4 | 6 |
| C-3 | 7.5 | 7.5 | 7.5 | 7.5 | 7.5 | 7.5 | 7.5 | 7.5 | 7.5 |
| D-3 | 0.4 | 0.4 | 0.4 | 0.4 | 0.4 | 0.4 | 0.4 | 0.4 | 0.4 |
| Carbon Black | 10 | 10 | 10 | — | — | — | — | — | — |
| Fumed Silica | — | — | — | 7 | 7 | 7 | — | — | — |
| $TiO_2$ | — | — | — | — | — | — | 10 | 10 | 10 |
| Mole Ratio SiH/SiOH | 31.3 | 15.0 | 11.8 | 31.3 | 15.0 | 11.8 | 31.3 | 15.0 | 11.8 |
| Foam Forming Ratio | 2 | 4.5 | 5 | 2 | 5 | 5.5 | 2 | 3.5 | 4.5 |
| Foamability | hetero-geneous poor | homo-geneous good | homo-geneous good | hetero-geneous poor | homo-geneous good | homo-geneous good | hetero-geneous poor | homo-geneous good | homo-geneous good |

Example 4

A low molecular weight $\alpha,\omega$ dihydroxydiorganopolysiloxane (B-4 and B-5) were added as follows to sample No. 6 in Table I.

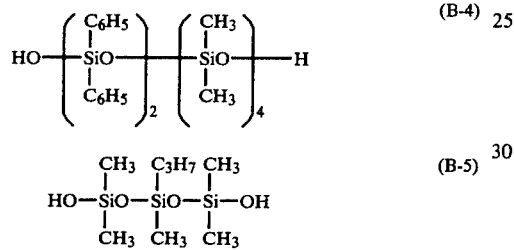

Each sample was cured under the same conditions as in Example 1, the foam-forming ratio and foamability evaluated, and the results set forth in Table IV.

TABLE IV

| | Sample | | | |
|---|---|---|---|---|
| | 28 | 29 | 30 | 31 |
| A-1 | 100 | 100 | 100 | 100 |
| C-1 | 5 | 5 | 5 | 5 |
| D-1 | 0.3 | 0.3 | 0.3 | 0.3 |
| B-4 | 4 | 6 | — | — |
| B-5 | — | — | 4 | 6 |
| Mole Ratio SiH/SiOH | 3.7 | 3.6 | 2.3 | 1.6 |
| Foam-Forming Ratio | 7 | 7.5 | 6 | 7 |
| Foamability | homo-geneous good | homo-geneous good | homo-geneous good | homo-geneous good |

I claim:

1. A foam-forming organopolysiloxane composition comprising:

(A) 100 parts by weight $\alpha,\omega$ diorganopolysiloxane diol having the general formula:

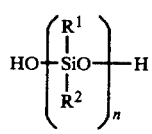

where $R^1$ and $R^2$ are monovalent hydrocarbon radicals or substituted monovalent hydrocarbon radicals, and n ranges from 200 to 3000;

(B) 0.05 to 50 parts by weight $\alpha,\omega$-diorganopolysiloxane diol having the general formula:

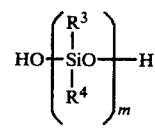

where $R^3$ and $R^4$ are monovalent hydrocarbon radicals or substituted monovalent hydrocarbon radicals, and m ranges from 2 to 46;

(C) 0.5 to 30 moles of Si-H groups per mole of silanol groups in (A) and (B) as an organohydrogenpolysiloxane having at least two Si-H groups per molecule and having the general formula:

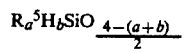

where $R^5$ is a saturated monovalent hydrocarbon radical, a is a number varying from 0 to 2 inclusive, b is a number varying from 1 to 3 inclusive, and a+b varies from 1 to 3 inclusive; and (D) 0.1 to 200 ppm of a platinum-containing compound to catalyze the dehydrogenation reaction of (A), (B) and (C).

2. The composition of claim 1 wherein $R^1$ and $R^2$ are methyl groups.

3. The composition of claim 1 wherein n ranges from 400 to 2000.

4. The composition of claim 1 wherein $R^3$ and $R^4$ are methyl groups.

5. The composition of claim 1 wherein m ranges from 2 to 24.

6. The composition of claim 1 wherein the amount of component (B) ranges from 1 to 20 parts by weight per 100 parts of component (A).

7. The composition of claim 1 wherein $R^5$ is a methyl group.

8. The composition of claim 1 wherein the amount of Si-H ranges from 3 to 20 moles per mole of Si-OH groups in (A) and (B).

9. The composition of claim 1 wherein the platinum compound is chloroplatinic acid.

10. The composition of claim 1 wherein the platinum compound is a platinum-olefin complex.

11. The composition of claim 1 wherein the amount of platinum ranges from 1 to 50 ppm.

UNITED STATES PATENT AND TRADEMARK OFFICE
CERTIFICATE OF CORRECTION

PATENT NO. : 4,461,851
DATED : July 24, 1984
INVENTOR(S) : Mitsuyoshi Hashimoto

It is certified that error appears in the above-identified patent and that said Letters Patent are hereby corrected as shown below:

On the cover page, after "Assignee", please delete "General Electric Company, Waterford, N. Y." and insert therefor -- Toshiba Silicone Co., Ltd., Tokyo, Japan --.

Signed and Sealed this

Fourth Day of December 1984

[SEAL]

Attest:

GERALD J. MOSSINGHOFF

Attesting Officer    Commissioner of Patents and Trademarks